United States Patent
Kim (10) Patent No.: US 7,175,146 B2
(45) Date of Patent: Feb. 13, 2007

(54) WALL MOUNT FOR DISPLAY APPARATUS (75) Inventor: Gwang-soo Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 79 days.

(21) Appl. No.: 10/942,123

(22) Filed: Sep. 16, 2004

(65) Prior Publication Data

US 2005/0061937 A1    Mar. 24, 2005

(30) Foreign Application Priority Data

Sep. 18, 2003    (KR)    ............... 10-2003-0064800

(51) Int. Cl.
*E04G 3/00*    (2006.01)
(52) U.S. Cl. .................. 248/279.1; 248/923; 211/100; 211/99
(58) Field of Classification Search ............... 248/921, 248/922, 923, 279.1, 281.11, 283.1, 285.1, 248/287.1, 292.13, 317, 324, 323, 919, 292.14; 211/99, 100, 101, 104, 171, 173; 348/825, 348/827

See application file for complete search history.

(56) References Cited

U.S. PATENT DOCUMENTS

| 749,670 | A * | 1/1904 | Gardner ................. 248/242 |
| 6,478,274 | B1 | 11/2002 | Oddsen, Jr. ............ 248/274.1 |
| 6,554,242 | B2 * | 4/2003 | Kim ......................... 248/371 |
| 6,604,722 | B1 * | 8/2003 | Tan ........................ 248/276.1 |
| 6,886,701 | B2 * | 5/2005 | Hong et al. ................ 211/99 |
| 6,964,399 | B1 * | 11/2005 | O'Neill ................. 248/292.13 |
| 2002/0033436 | A1 * | 3/2002 | Peng et al. ............. 248/284.1 |
| 2005/0167549 | A1 * | 8/2005 | Ligertwood ............ 248/122.1 |

FOREIGN PATENT DOCUMENTS

| KR | 20-0163200 | 10/1999 | |
| KR | 2000-11034 | 6/2000 | ............ 5/66 |
| KR | 20-248228 | 9/2001 | ............ 5/655 |
| KR | 20-256422 | 11/2001 | ............ 5/655 |
| KR | 20-295586 | 11/2002 | ............ 5/655 |
| KR | 1020030011056 | 2/2003 | |

OTHER PUBLICATIONS

Korean Office Action for corresponding Korean Patent Application No. 10-2003-0064800 dated Sep. 28, 2005.

* cited by examiner

*Primary Examiner*—A. Joseph Wujciak, III
(74) *Attorney, Agent, or Firm*—Staas & Halsey LLP (57) ABSTRACT

A wall mount for a display apparatus includes a base plate mounted on a wall; a mounting bracket combined to the base plate, and having an angle control part providing a plurality of tilting angles for the display apparatus; a tilting bracket rotatably combined to a lower part of the mounting bracket, and on which the display apparatus is mounted; a connection link connecting the mounting bracket and the tilting bracket; and a plunger unit combined to the connection link and elastically combined to the angle control part, and selectively adjusting a tilting angle of the tilting bracket with respect to the mounting bracket by sliding up and down through the angle control part. The wall mount for a display apparatus is capable of supporting the display apparatus stably and adjusting a tilting angle thereof promptly and readily.

20 Claims, 8 Drawing Sheets

WALL MOUNT FOR DISPLAY APPARATUS

CROSS-REFERENCE TO RELATED APPLICATIONS

This application claims the benefit of Korean Patent Application No. 2003-64800, filed on Sep. 18, 2003, in the Korean Intellectual Property Office, the disclosure of which is incorporated herein by reference.

BACKGROUND OF THE INVENTION

1. Field of the Invention

The present invention relates to a wall mount, and more particularly, a wall mount for a display apparatus which can selectively adjust a tilting angle of a screen of a flat display apparatus mounted on a wall.

2. Description of the Related Art

A PDP (Plasma Display Panel) or an LCD (Liquid Crystal Display) has excellent image quality and other features and thus is widely used for a TV and a monitor as a flat display apparatus. Therefore, a wall-mountable display apparatus is in demand because it comparatively reduces a limit to an installation space for the wall-mountable display apparatus.

Figure 1:
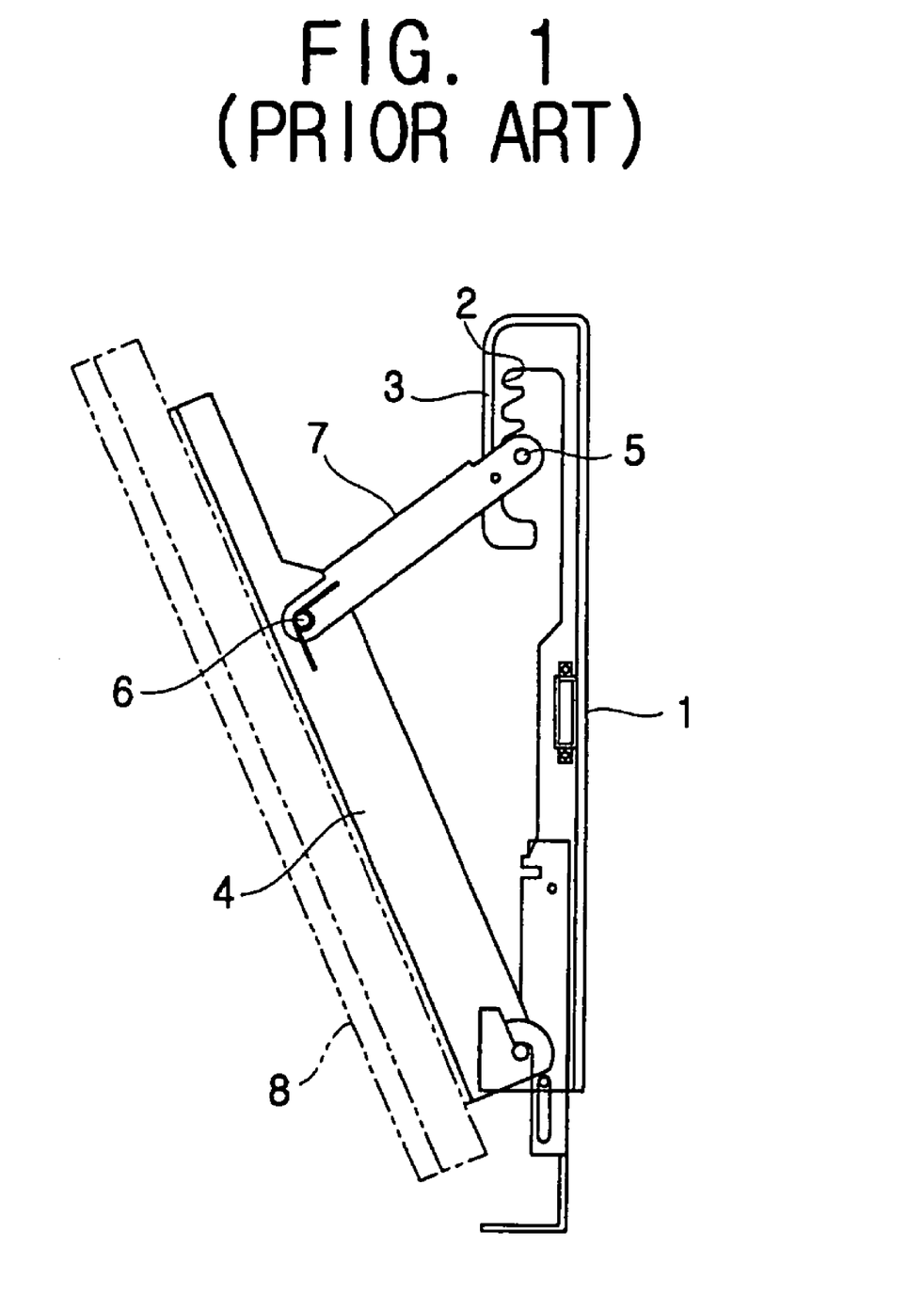
FIG. 1 is a lateral view of a conventional wall mount for display apparatus.

In FIG. 1, a conventional wall mount for a display apparatus comprises a mounting bracket 1, an angle control part 3 provided in an upper part of the mounting bracket 1, and having a plurality of angle control grooves 2, a tilting bracket 4 rotatably coupled to a lower part of the mounting bracket 1 and on which a display apparatus 8 is mounted, and a link part 7 having an angle control bar 5 in a first end thereof and a hinge bar 6 in a second end thereof. The angle control bar 5 is constrained in the angle control grooves 2 of the angle control part 3, and the hinge bar 6 is combined to the tilting bracket 4 by a hinge. A wall mount with this configuration is disclosed in Korean Patent Application No. 1998-23535.

However, the above wall mount for a display apparatus requires a user to control the link part 7 to move the angle control bar 5 up and down along the angle control grooves 2 of the angle control part 3, and thus usability and efficiency of control are decreased, while causing a time-consuming manual process.

Additionally, the angle control bar 5 is located in the angle control grooves 2 of the angle control part 3 without a separate combiner, and therefore it is difficult to maintain stable coupling.

SUMMARY OF THE INVENTION

Accordingly, it is an aspect of the present invention to provide a wall mount for a display apparatus capable of supporting a display apparatus stably and adjusting a tilting angle thereof promptly and readily.

Additional aspects and/or advantages of the invention will be set forth in part in the description which follows and, in part, will be obvious from the description, or may be learned by practice of the invention.

The foregoing and/or other aspects of the present invention are achieved by providing a wall mount for a display apparatus comprising a base plate mounted on a wall; mounting brackets combined to the base plate, and each having an angle control part providing a plurality of tilting angles for the display apparatus; tilting brackets rotatably combined to a lower part of the mounting brackets, and on which the display apparatus is mounted; connection links connecting the mounting brackets to the tilting brackets; and plunger units combined to the connection links and elastically combined to the angle control parts, and selectively adjusting a tilting angle of the tilting brackets with respect to the mounting brackets by sliding up and down through the angle control parts.

According to an aspect of the present invention, the plunger units each comprises a cover coupled to an end part of the connection link; an elastic member accommodated in the cover; and stoppers coupled to opposite ends of the elastic member respectively and elastically combined to the angle control part. The angle control parts each comprise a guide hole formed lengthwise corresponding to lateral sides of the mounting brackets and guiding the stoppers to slide up and down, and a plurality of angle control grooves provided in the guide hole with a regular interval, and to which the stoppers are elastically combined.

According to an aspect of the present invention, the elastic member comprises a compression spring.

According to an aspect of the present invention, an end part of the stoppers is of a semicircular shape to be easily combined to and released from the angle control grooves.

According to an aspect of the present invention, the mounting bracket is provided on lateral sides of the base plate in a pair.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
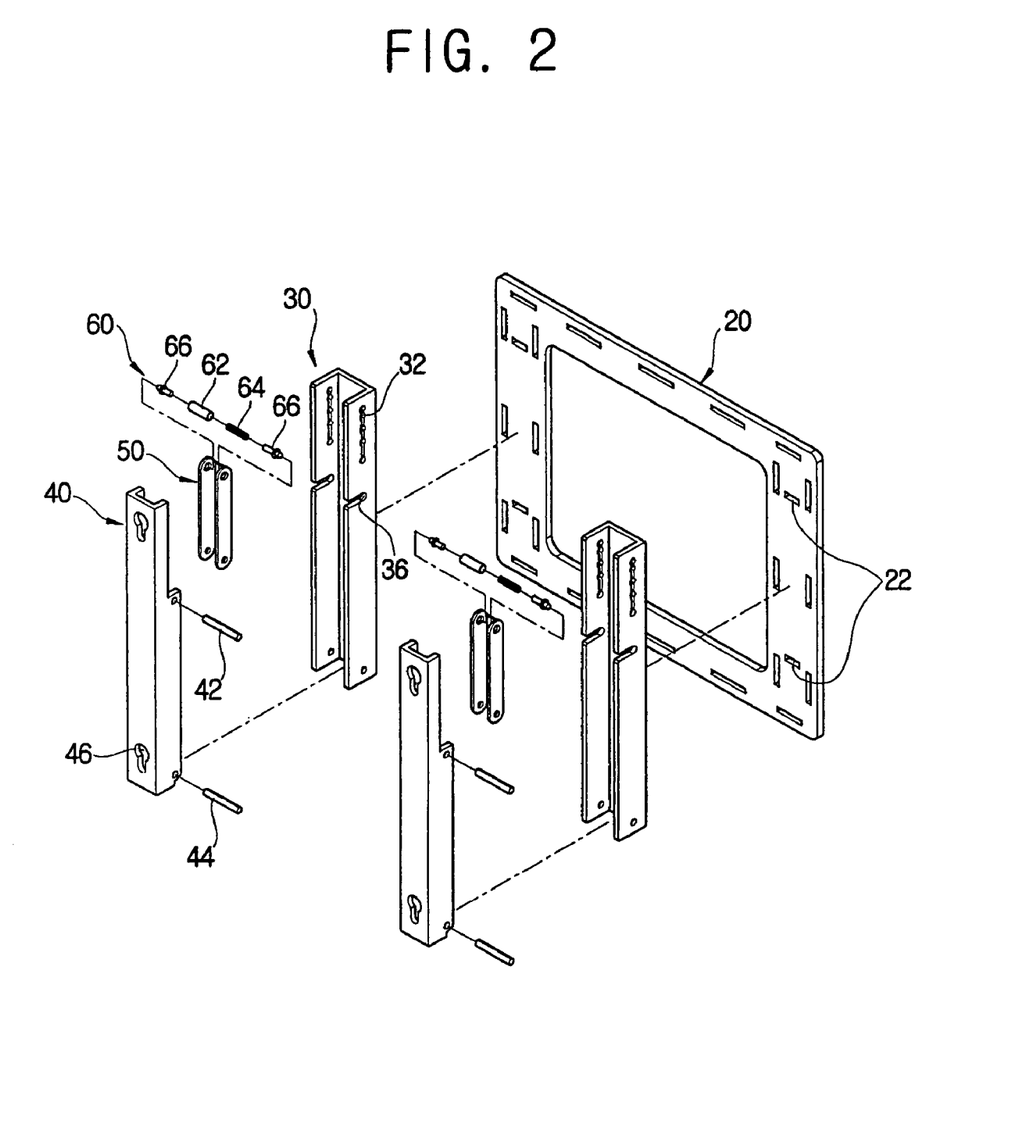
FIG. 2 is an exploded perspective view of a wall mount for display apparatus according to an embodiment of the present invention.
Figure 3:
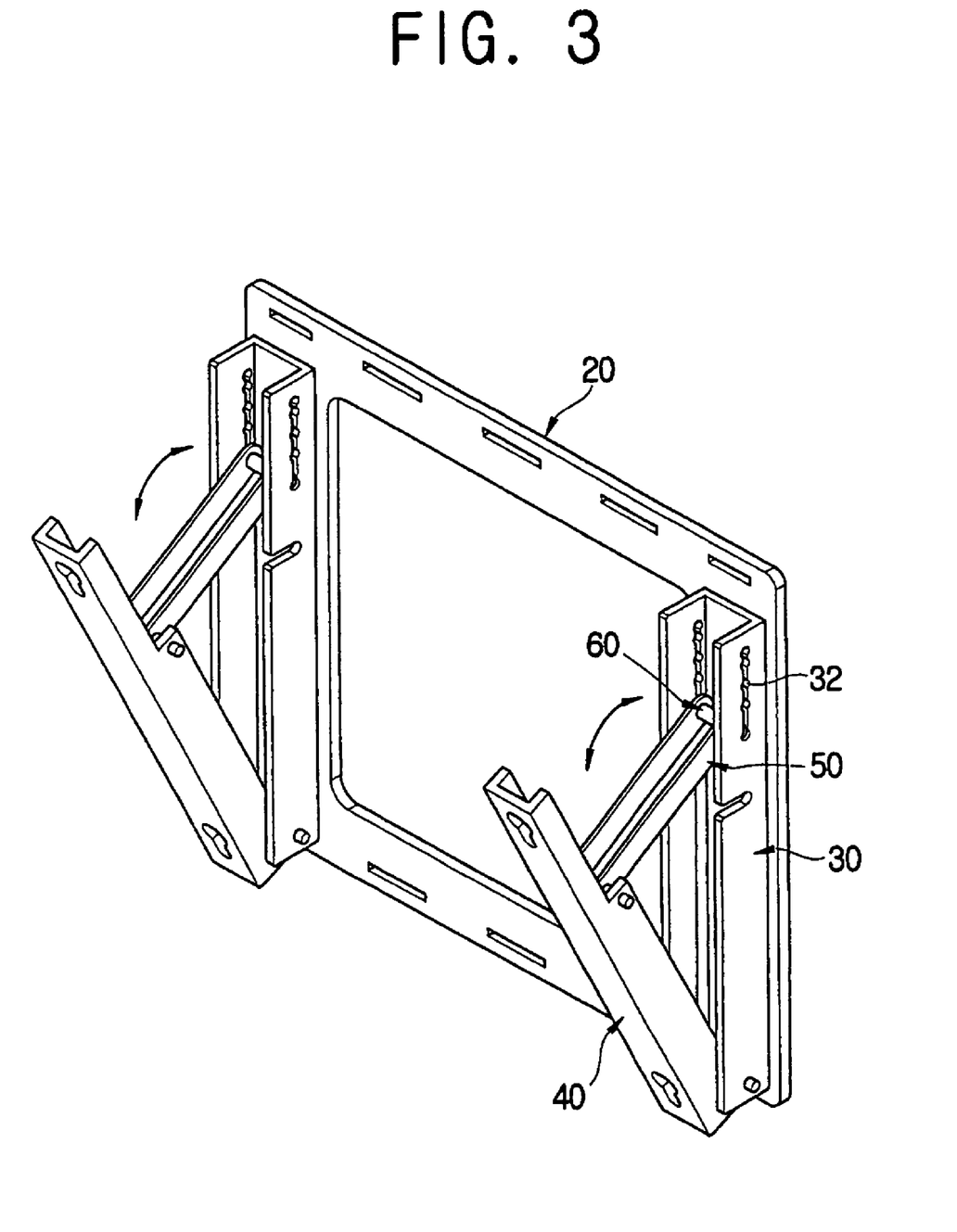
FIG. 3 is a combined perspective view of FIG. 2.

FIGS. 2 and 3 illustrate a wall mount for a display apparatus comprising two mounting brackets 30 combined with two tilting brackets 40. However, it is understood by those skilled in the art that the number of mounting brackets 50 and tilting brackets 40 may vary without departing from the principles of the invention. For example, one or more than two mounting brackets 50 and tilting brackets 40 may be used.

Figure 4:
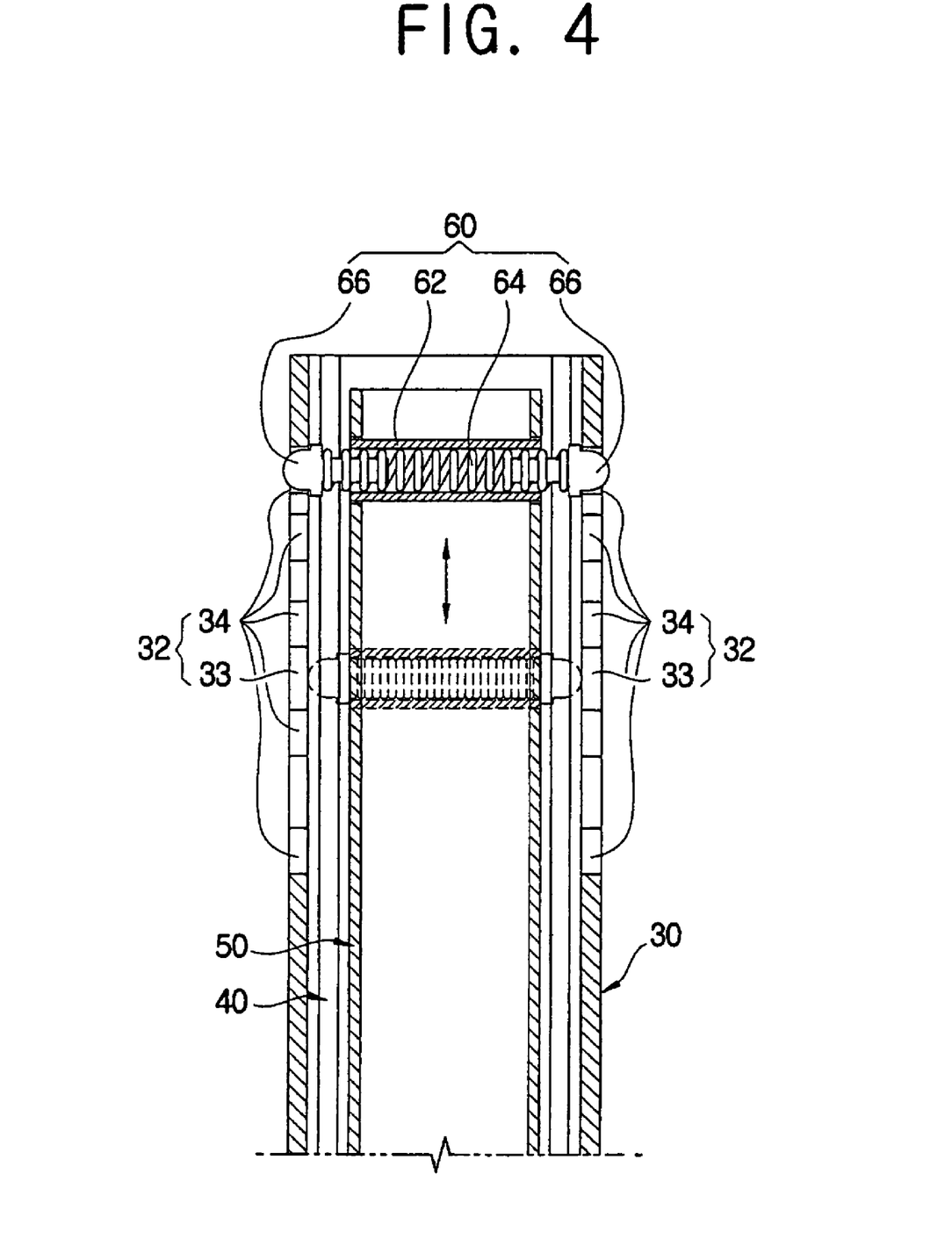
FIG. 4 is a front view of the wall mount for a display apparatus according to the embodiment of the present invention.
Figure 5:
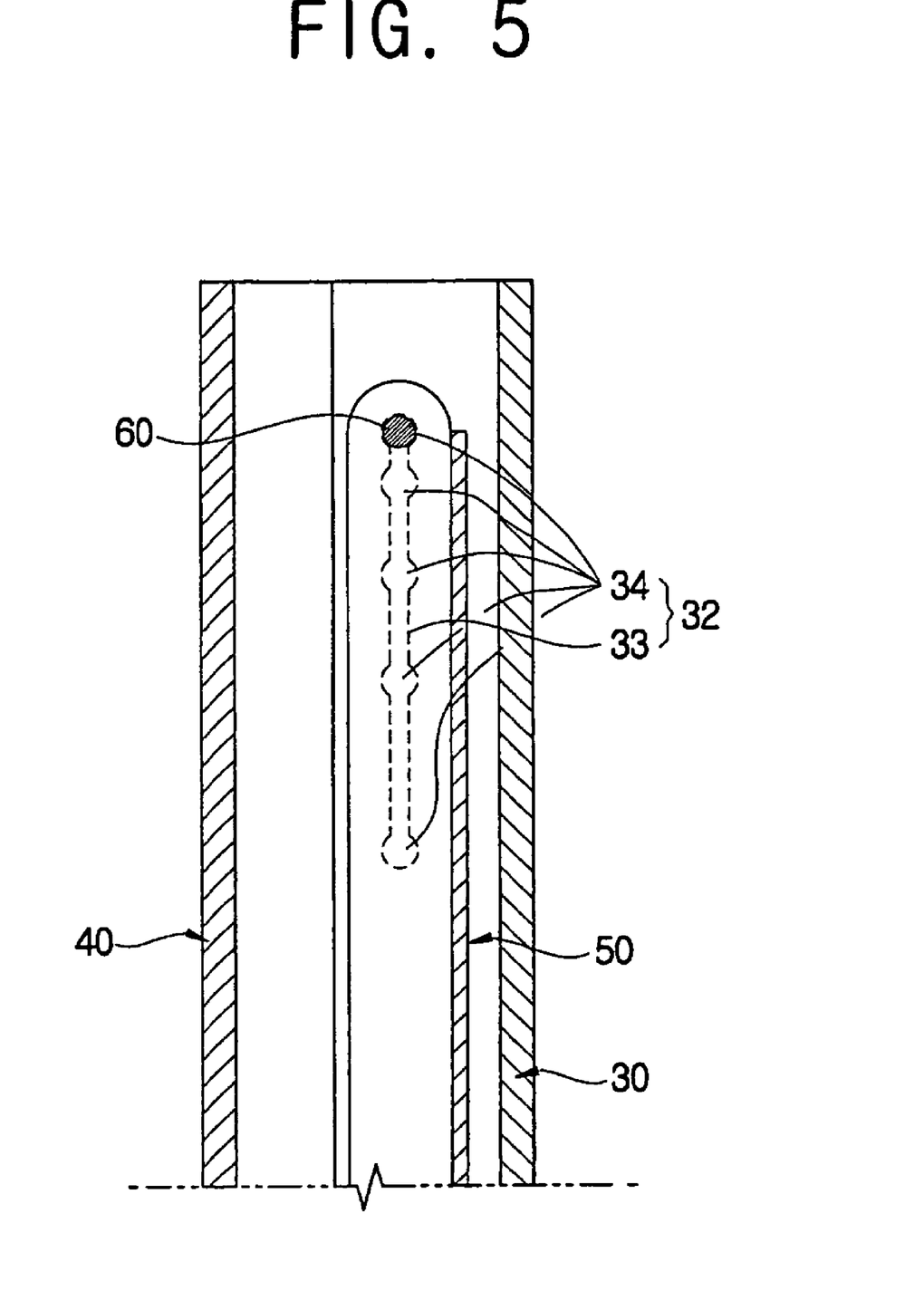
FIG. 5 is a lateral view of the wall mount for a display apparatus according to the embodiment of the present invention.

FIG. 2 is an exploded perspective view of a wall mount for a display apparatus, FIG. 3 is a combined perspective view of FIG. 2, FIG. 4 is a partial front sectional view of combination of plunger units of a wall mount for a display apparatus, and FIG. 5 is a partial side sectional view of the combination of the plunger units of the wall mount for a display apparatus.

In FIG. 2, a wall mount for a display apparatus according to an embodiment of the present invention comprises a base plate 20 mounted on a wall; mounting brackets 30 combined to the base plate 20 and each having an angle control part 32, which is capable of adjusting a tilting angle; tilting brackets 40 tiltably combined to the mounting brackets 30, and on which the display apparatus (not shown) is mounted; connection links 50 coupling the mounting brackets 30 to the tilting brackets 40; and plunger units 60 combined to the connection links 50 and elastically combined to the angle control parts 32, and selectively controlling the tilting angle of the tilting brackets 40 with respect to the mounting brackets 30 by sliding up and down with respect to each angle control part 32.

The base plate 20 is firmly mounted on a wall (not shown) to stably support the mounting brackets 30, the tilting brackets 40, and the display apparatus, and combining parts 22 to which the mounting brackets 30 are combined are provided in a front side of the base plate 20. An alternative structure of the combining parts 22 may be provided as long as the combining parts 22 and the mounting brackets 30 are firmly combined.

The plunger units 60 are bar shaped, and each comprise a cover 62 coupled to a second end part of the connection links 50; an elastic member 64 accommodated inside of cover 62; and stoppers 66 extended and compressed by elastic force of the elastic member 64 and elastically combined to the angle control part 32.

A first end part of the connection links 50 is rotatably combined to the tilting brackets 40 by shafts 42, and the second end part is coupled to the plunger units 60 to convert a movement of the plunger units 60 into a rotational movement. Accordingly, the tilting brackets 40 are tilted with respect to the mounting brackets 30 by the connection links 50 operated in accordance with the movement of the plunger units 60.

The tilting brackets 40 are tiltably combined to the mounting brackets 30 by shafts 44, and a pair of mounting parts 46 are respectively provided in a front upper part and a front lower part of tilting brackets 40 to mount the display apparatus thereon.

Additionally, the angle control parts 32 to which the plunger units 60 are coupled, are provided on lateral sides of the mounting brackets 30 in a longitudinal direction, corresponding to each other, and each comprise a guide hole 33 guiding the stoppers 66 to slide up and down; and a plurality of angle control grooves 34 provided in the guide hole 33 with a regular interval, and elastically combined to the stoppers 66. Since the intervals of the guide hole 33 and the width of the plurality of angle control grooves 34 affect the strength that is required when a user wants to change the tilting angle of the tilting brackets 40 with respect to the mounting brackets 30, the user can adjust initial strength corresponding to a holding force of the plunger units 60 by increasing or decreasing the intervals of the guide hole 33 and the width of the plurality of angle control grooves 34.

The number of the angle control grooves 34 vary depending on a desired tilting angle of the display apparatus.

The cover 62 is cylindrically shaped, and opposite ends of the cover 62 have openings to allow the elastic member 64 to be inserted therethrough. For the elastic member 64, various elastic materials can be selectively employed if they are able to elastically support the display apparatus mounted on the mounting brackets 30 and the tilting brackets 40, but a compression spring is preferable because of its excellent durability and functionality.

The stoppers 66 are pressed and combined to the angle control parts 34 by the elastic members 64, and a pressing force is generated therefrom to enable the stoppers 66 to maintain combination with the angle control parts 34 unless external force is applied by the user, exceeding the pressing force. An end part of the stoppers 66 is of a semi-circle shape to be easily constrained in and released from the angle control grooves 34.

On the other hand, when the compression spring is used for the elastic member 64, the up and down movement of the plunger units 60 becomes more changeable by adjusting an outer diameter of the compression spring and the number of coils in the compression spring.

In this embodiment of the present invention, a pair of mounting brackets 30 is provided on lateral sides of the base plate 20, however the number and a method of disposing the mounting brackets 30 thereon can be changed, as necessary. Further, an interrupt-proof groove 36 is provided in a side of each of the mounting brackets 30 to prevent a hinge part connecting connection links 50 to tilting brackets 40 from being detached.

Figure 6A:
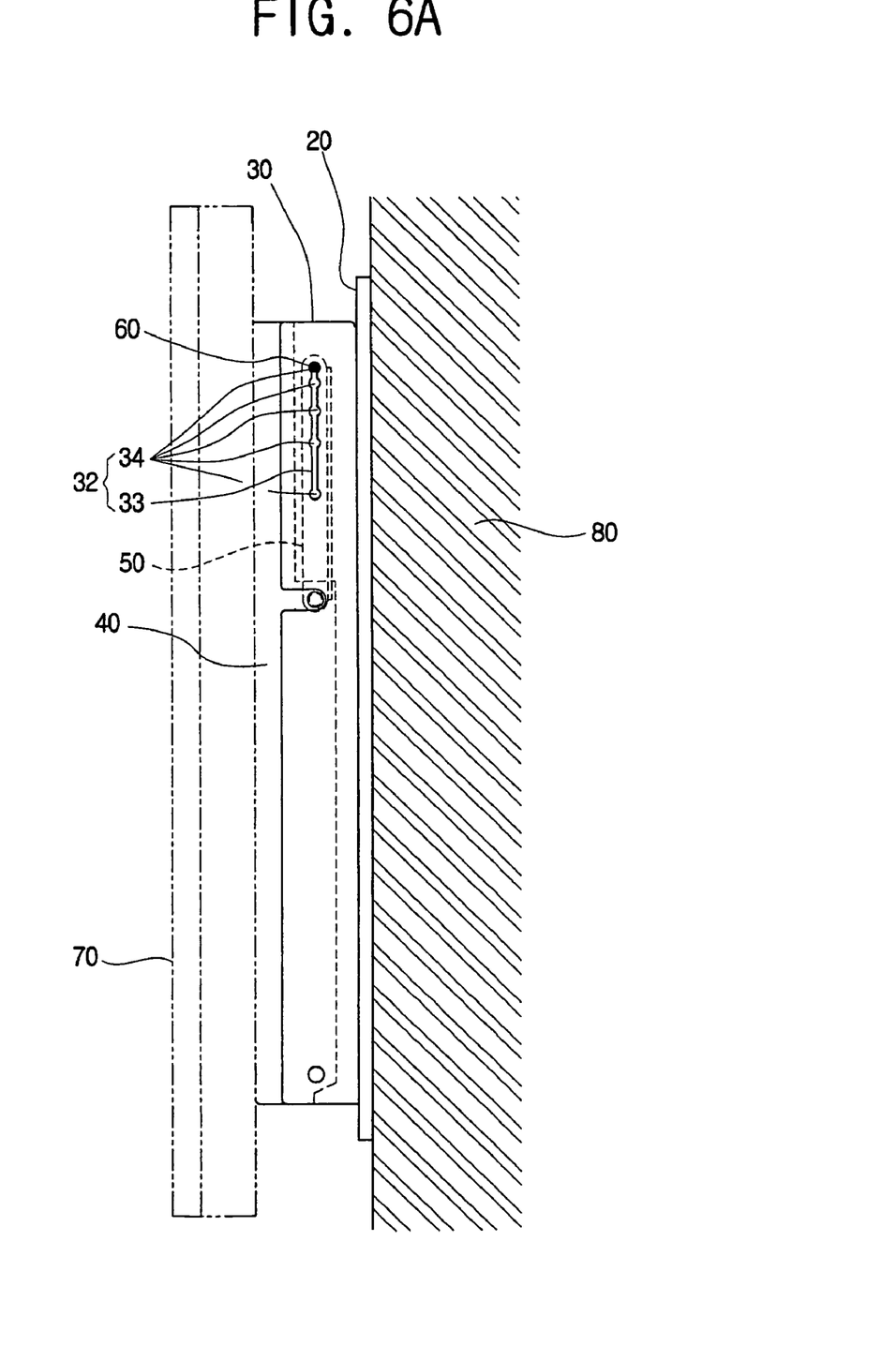
FIGS. 6A, 6B, and 6C illustrate an operation of the wall mount for a display apparatus according to the embodiment of the present invention.
Figure 6B:
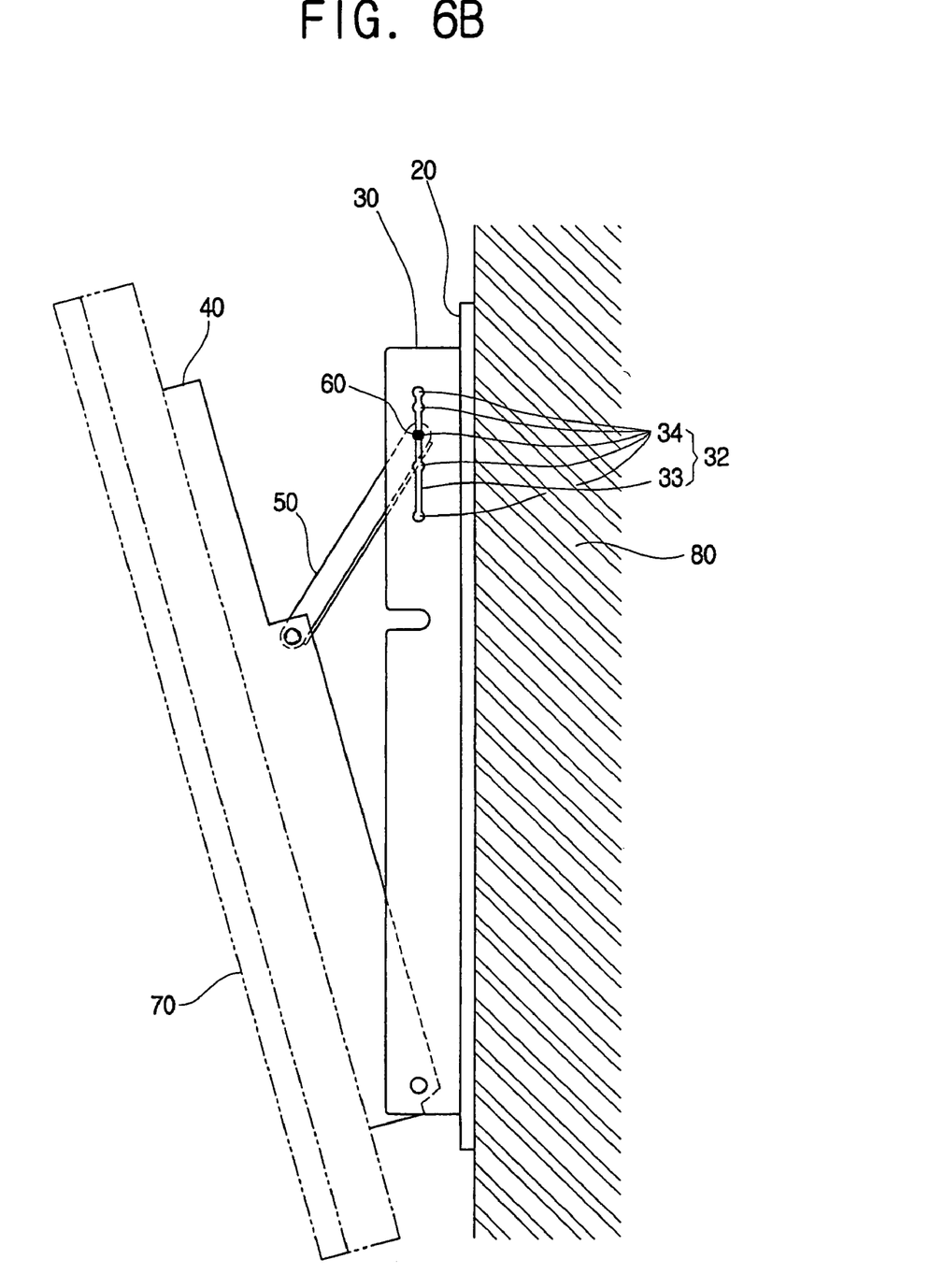
Figure 6C:
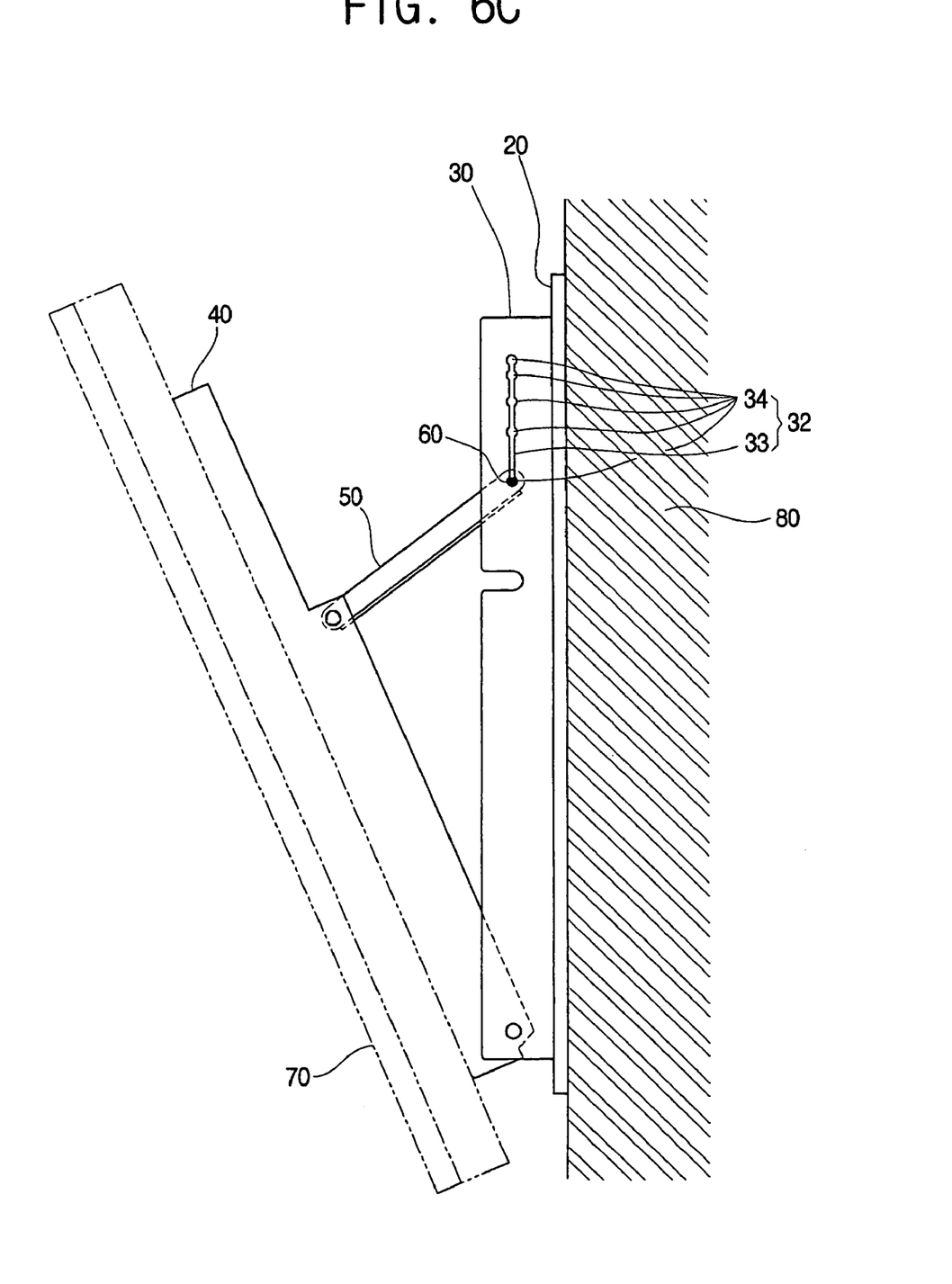

FIGS. 6A, 6B, and 6C illustrate an operation of a wall mount for the display apparatus according to the embodiment of the present invention.

In FIG. 6A, a display apparatus 70 is disposed in parallel to a wall 80 by the wall mount for a display apparatus. That is, the tilting brackets 40 are combined in parallel to the mounting brackets 30 without forming a tilting angle between the tilting brackets 40 and the mounting brackets 30. The plunger units 60 mounted on the base plate 20 are then coupled to the angle control grooves 34 formed in an uppermost part of the angle control part 32 of the mounting brackets 30.

To adjust the tilting angle of a screen of the display apparatus 70, the display apparatus 70 mounted on the tilting brackets 40 is pulled by external force and the plunger units 60 are released from the angle control grooves 34 provided in the uppermost part of the angle control part 32 of the mounting brackets 30.

The plunger unit 60 then slides down along the guide hole 33 and is then elastically combined to an angle control groove 34 below the previous angle control groove 34. Next, an internal elastic member 64 (the extension thereof not shown) is extended when the plunger unit 60 is coupled in the angle control grooves 34, and compressed when the plunger unit 60 is sliding up and down along the guide hole 33.

In FIGS. 6B and 6C, the tilting angle of the tilting brackets 40 with respect to the mounting brackets 30 can be adjusted by repeating the above operation.

The plunger unit 60 is released from a lowest angle control groove 34 provided in the angle control part 33 by pushing the display apparatus with external force.

Then, the plunger unit 60 slides up along the guide hole 33 and is elastically combined to an angle control groove 34 above the previous angle control groove 34.

The tilting angle of the tilting bracket 40 with respect to the mounting bracket 30 can be adjusted by repeating the above operation.

With the above configuration, the wall mount for a display apparatus according to the present invention is capable of supporting the display apparatus stably and adjusting the tilting angle thereof promptly and readily.

Accordingly, usability and functionality of the wall mount for a display apparatus are improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wall mount for a display apparatus to be mounted on a vertical surface, comprising:
    a base plate mountable on the vertical surface;
    a mounting bracket combined to the base plate, and having an angle control part including a plurality of angle control grooves to provide a plurality of tilting angles for the display apparatus;
    a tilting bracket rotatably combined to a lower part of the mounting bracket, and on which the display apparatus is mounted;
    a connection link connecting the mounting bracket and the tilting bracket; and
    a plunger unit combined to the connection link and elastically combined to the angle control part, and selectively adjusting a tilting angle of the tilting bracket with respect to the mounting bracket by sliding up and down through the angle control part, the plunger unit comprising a cover coupled to an end part of the connection link and an elastic member accommodated in the cover.

2. The wall mount for a display apparatus of claim 1, wherein the plunger unit further comprising:
    stoppers coupled to opposite ends of the elastic member, respectively, and elastically combined to the angle control part, wherein
    the angle control part comprises a guide hole formed lengthwise corresponding to lateral sides of the mounting bracket and guiding the stoppers to slide up and down; and a plurality of angle control grooves provided in the guide hole with a regular interval, and to which the stoppers are elastically combinable according to an angle between the tilting bracket and mounting bracket.

3. The wall mount for a display apparatus of claim 2, wherein the elastic member comprises a compression spring.

4. The wall mount for a display apparatus of claim 2, wherein an end part of the stoppers is of a semicircular shape to be easily combined to and released from the angle control grooves.

5. The wall mount for a display apparatus of claim 3, wherein an end part of the stoppers is of a semicircular shape so as to be easily combined to and released from the angle control grooves.

6. The wall mount for a display apparatus of claim 1, wherein the mounting bracket is provided on lateral sides of the base plate.

7. The wall mount for a display apparatus of claim 2, wherein the cover is of a cylindrical shape and opposite ends of the cover have openings to allow the elastic member to be inserted therethrough.

8. The wall mount for a display apparatus of claim 3, wherein an adjustability of the plunger unit is based upon an outer diameter of the compression spring and a number of coils in the compression spring.

9. A wall mount for a display apparatus to be mounted on a vertical surface, comprising:
    a base plate mountable on the vertical surface;
    mounting brackets combined to the base plate, and each having an angle control part including a plurality of angle control grooves to provide a plurality of tilting angles for the display apparatus;
    tilting brackets rotatably combined to corresponding lower parts of the mounting brackets, and on which the display apparatus are mounted;
    connection links connecting the corresponding mounting brackets and the tilting brackets; and
    plunger units combined to the corresponding connection links and elastically combined to the corresponding angle control parts, and selectively adjusting a tilting angle of the tilting brackets with respect to the mounting brackets by sliding up and down through the angle control parts, the plunger units each comprising a cover coupled to an end part of the connection links and an elastic member accommodated in the cover.

10. The wall mount for a display apparatus of claim 9, wherein the plunger units each further comprising:
    stoppers coupled to opposite ends of the elastic member, respectively, and elastically combined to the angle control parts, and wherein
    the angle control parts each comprises a guide hole formed lengthwise corresponding to lateral sides of the mounting bracket and guiding the stoppers to slide up and down; and a plurality of angle control grooves provided in the guide hole with a regular interval, and to which the stoppers are elastically combinable according to an angle between the corresponding tilting bracket and mounting bracket.

11. The wall mount for a display apparatus of claim 9, wherein the tilting brackets comprise shafts, wherein a first end part of the connection links is rotatably combined to the tilting brackets by the shafts and a second end part is coupled to the plunger units to convert a movement of the plunger units into a rotational movement.

12. The wall mount for a display apparatus of claim 11, wherein the tilting brackets further comprise mounting parts in a front upper part and a front lower part of the tilting brackets to mount the display apparatus thereon.

13. The wall mount for a display apparatus of claim 10, wherein the angle control parts to which the plunger units are coupled are provided on lateral sides of the mounting brackets in a longitudinal direction, corresponding to each other.

14. The wall mount for a display apparatus of claim 10, wherein a rotational force to be applied by a user depends upon a number of intervals of each guide hole and a width of the plurality of angle control grooves.

15. The wall mount for a display apparatus of claim 14, wherein a tilting angle of the display apparatus depends on a predetermined number of the plurality of angle control grooves.

16. The wall mount for a display apparatus of claim 10, wherein the stoppers are pressed and combined to the angle control parts by the elastic members and a pressing force is generated therefrom to enable the stoppers to maintain a combination with the corresponding angle control parts.

17. The wall mount for a display apparatus of claim 9, wherein the display apparatus is pulled by external force and the plunger units are released from the angle control grooves provided in an uppermost part of the angle control parts of the mounting brackets.

18. The wall mount for a display apparatus of claim 17, further comprising internal elastic members which extend when the plunger units are coupled in the angle control grooves and compress when the plunger units are sliding along the guide holes.

19. A wall mount for a display apparatus to be mounted on a vertical surface, comprising:
- a base plate mountable on the vertical surface;
- mounting brackets combined to the base plate, and each having a plurality of recesses wherein each recess provides a different tilting angle for the display apparatus;
- tilting brackets rotatably combined to a lower part of the mounting brackets, and on which the display apparatus is mounted;
- connection links connecting the mounting brackets and the tilting brackets; and
- plunger units combined to the connection links and elastically inserted into the corresponding recesses, and selectively adjusting a tilting angle of the tilting brackets with respect to the mounting brackets by sliding up and down through the recesses, the plunger units each comprising a cover coupled to an end Part of the connection links and an elastic member accommodated in the cover,
- wherein the wall mount is slidingly adjustable to view the display apparatus from the plurality of tilting angles.

20. A wall mount for a display apparatus to be mounted on a vertical surface, comprising:
- a base plate mountable on the vertical surface;
- a mounting bracket combined to the base plate, and having an angle control part including a plurality of angle control grooves to provide a plurality of tilting angles for the display apparatus;
- a tilting bracket rotatably combined to a lower part of the mounting bracket, and on which the display apparatus is mounted;
- a connection link connecting the mounting bracket and the tilting bracket; and
- a plunger unit combined to the connection link and elastically combined to the angle control part, and selectively adjusting a tilting angle of the tilting bracket with respect to the mounting bracket by sliding up and down through the angle control part the plunger unit comprising a cover coupled to an end part of the connection link and an elastic member accommodated in the cover.

* * * * *

UNITED STATES PATENT AND TRADEMARK OFFICE
CERTIFICATE OF CORRECTION

| | | |
|---|---|---|
| PATENT NO. | : 7,175,146 B2 | Page 1 of 1 |
| APPLICATION NO. | : 10/942123 | |
| DATED | : February 13, 2007 | |
| INVENTOR(S) | : Gwang-soo Kim | |

It is certified that error appears in the above-identified patent and that said Letters Patent is hereby corrected as shown below:

Title Page, Column 1 (Assignee), Line 1, change "Suwon" to --Suwon-Si--.

Column 7, Column 18, change "Part" to --part--.

Signed and Sealed this

Twenty-sixth Day of February, 2008

JON W. DUDAS
*Director of the United States Patent and Trademark Office*